3,803,093
METHYL METHACRYLATE COPOLYMER WHICH MAY BE HYDRATED

Charles W. Neefe, Box 429, Big Spring, Tex. 79720
No Drawing. Continuation-in-part of application Ser. No. 118,835, Feb. 25, 1971, which is a continuation-in-part of abandoned application Ser. No. 562,022, May 16, 1966. This application Aug. 18, 1972, Ser. No. 282,000
Int. Cl. C08f 15/40
U.S. Cl. 260—66       3 Claims

ABSTRACT OF THE DISCLOSURE

A contact lens made from N-(1,1-dimethyl-3-oxobutyl) acrylamide, methyl methacrylate, and acrylic acid copolymer is hard and rigid in the dehydrated state and flexible and dimensionally stable when hydrated and absorbs from 10 weight percent to 70 weight percent water when fully hydrated and has a water contact wetting angle of 0° when hydrated.

---

This is a continuation-in-part of application Ser. No. 118,835, filed Feb. 25, 1971, for "A Dimensionally Stable Hydrophilic Contact Lens" now pending which is a continuation-in-part from application Ser. No. 562,022 filed May 16, 1966, and now abandoned.

The present contact lenses are of two types: the soft hydrophilic and the hard hydrophobic. The soft hydrophilic lenses are currently made from cross-linked ethylene glycol monomethacrylate. The hard hydrophobic lenses are currently made from polymethyl methacrylate. The soft hydrophilic lenses are kept sterile by boiling because they tend to absorb antimicrobial agents such as benzalkonium chloride and bind the antimicrobial agents into the lens structure and the lens becomes toxic to the ocular tissue. The hard lenses made from methyl methacrylate do not absorb these antimicrobia agents and therefore may be stored in and cleaned with solutions containing preservatives such as benzalkonium chloride. Lenses made from methyl methacrylate are very hydrophobic and a wetting agent is required for the water to form a smooth layer on the surface of the lens. If no wetting solution is used the water will form beads or droplets on the surface and prevent the lens from forming an image. The contact angle for methyl methacrylate is 60° therefore each droplet will contact the lens surface at an angle of 60°. A wetting agent will lower the wetting or contact angle to approximately 30° which is within range of acceptability.

The plastic herein disclosed has a water contact angle of 0° when hydrated. This provides a greater degree of comfort for the wearer and a reduction in surface friction and less foreign body sensation to the eye.

The material is hard and rigid in the dehydrated state which allows it to be manufactured by the techniques and processes which have evolved over the past twenty years in the contact lens industry. Polishing is the same as polymethyl methacrylate except the polishing slurry is made acid.

The material is made as follows:

The solid monomer N-(1,1-dimethyl-3-oxobutyl) acrylamide is dissolved in the liquid monomers methyl methacrylate and acrylic acid and polymerized using any of the standard processes used with methyl methacrylate and well known to the art. Catalysts such as azobis (2 methyl propionitrile), tertiary-butyl-peroctoate, or benzol peroxide may be used to achieve polymerization. The material may be cast in silicone molds to form contact lens blanks or cast in long rods which may be cut in to suitable discs from which contact lenses are made. Excellent results have been realized using a wide range of concentrations of N-(1,1-dimethyl-3-oxobutyl) acrylamide. Concentrations as low as 1% N-(1,1-dimethyl-3-oxobutyl) acrylamide and as high as 50% have been used with excellent results. Acrylic acid concentrations of 2% to 20% have been used. The finished lenses are treated with a base or alkaline solution such as sodium hydroxide 2%, ammonium hydroxide, or potassium hydroxide. This chemical treatment increases the water absorption of the lens material. The lenses are then placed in normal saline to remove the sodium hydroxide and bring the lenses to equilibrium. The material may be cross-linked after hydration to stabilize its water content.

A typical formulation is as follows. In a glass tube place 15 g. N-(1,1-dimethyl-3-oxobutyl) acrylamide, 100 g. methyl methacrylate, 10 g. acrylic acid, and .07 g. azobis (2 methyl propionitrile) purge of oxygen and place under a nitrogen blanket and heat to 40° C. for twelve hours and post cure at 70° C. for sixteen hours and cut into contact lens blanks. Lenses made from this material are found to be exceptionally strong and very durable in use.

The homopolymer of N-(1,1-dimethyl-3-oxobutyl) acrylamide is a clear slightly hydrophilic solid. The homopolymer of methyl methacrylate is a clear hard hydrophobic solid. The homopolymer of acrylic acid is very hydrophilic. The copolymer of N-(1,1-dimethyl-3-oxobutyl) acrylamide, acrylic acid, and methyl methacrylate is a clear hard solid which may be hydrated. Increasing the quantity of N-(1,1-dimethyl-3-oxobutyl) acrylamide will decrease the swelling of the material with hydration and increase the dimensional stability in the hydrated state. It has been found most desirable to limit the water uptake and increase of size from the dehydrated to hydrated state for the following reasons. (1) The increase in size from dehydrated to the hydrated state produces a corresponding change in radius of curvature the larger diameter hydrated lens being much flatter than the dehydrated lens. Therefore a lens which absorbs larger amounts of water during hydration will require a dehydrated lens having a much shorter radius of curvature than the resulting hydrated lens. Lenses having short radii of curvature are difficult to fabricate as the curvature approaches a hemisphere. Also the refractive surface power increases rapidly as the radius shortens; therefore, the accuracy to which the lens radius must be made increases. (2) Lenses which expand greatly from the dehydrated to hydrated state are more sensitive to changes in curvature while being worn on the eye. These changes are due to atmospheric drying and changes in the quantity and quality of the tears in which the lens is bathed.

Lenses currently made from the hydrogel ethylene glycol monomethacrylate are very soft and flexible. The lens made from the herein disclosed material is inherently a rigid material which will not deform or wrinkle by eyelid action. It is well known that the hydrogel materials are very soft, pliable materials which will flex, wrinkle and distort in response to eyelid pressure and thereby result in a distorted visual image. Furthermore, the stiff copolymer material recited is ideally suitable for correcting astigmatism. The hydrogel materials will generally conform to the toric cornea and the torosity is present on the front surface of the contact lens, and therefore, the astigmatism remains uncorrected. The material herein disclosed may be chemically sanitized by storage in a solution of sodium chloride 0.9%, thimerosal 0.001%, disodium edetate (ethylenediaminetetraacetic acid) 0.1%.

Other applications of this copolymer material include dentures, artificial eyes, and biological implants.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

What is claimed is:

1. A contact lens of concavo-convex form in section of a curvature substantially the same as the cornea to which it is applied, which is made of a hydrated copolymer, said copolymer consisting of 100 parts by weight methyl methacrylate copolymerized with from 1 to 50 parts by weight of N-(1,1-dimethyl-3-oxobutyl) acrylamide and 2 to 20 parts by weight of acrylic acid.

2. The contact lens of claim 1 wherein said copolymer is 100 parts by weight methyl methacrylate, 15 parts by weight N-(1,1-dimethyl-3-oxobutyl) acrylamide, and 10 parts by weight acrylic acid.

3. The contact lens of claim 1, hydrated in an alkaline solution.

References Cited
UNITED STATES PATENTS 3,277,056   10/1966   Coleman _____ 260—63

STANFORD M. LEVIN, Primary Examiner

U.S. Cl. X.R.
260—89.5 A; 351—160